(12) United States Patent
Povinelli et al.

(10) Patent No.: US 7,177,513 B2
(45) Date of Patent: *Feb. 13, 2007

(54) METAMATERIALS EMPLOYING PHOTONIC CRYSTAL

(75) Inventors: Michelle L. Povinelli, Somerville, MA (US); Steven G. Johnson, St. Charles, IL (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 28 days.

This patent is subject to a terminal disclaimer.

(21) Appl. No.: 10/412,571

(22) Filed: Apr. 11, 2003

(65) Prior Publication Data

US 2003/0223721 A1 Dec. 4, 2003

Related U.S. Application Data

(60) Provisional application No. 60/372,051, filed on Apr. 12, 2002.

(51) Int. Cl.
*G02B 6/10* (2006.01)

(52) U.S. Cl. .................. 385/129; 385/130; 385/131; 385/132

(58) Field of Classification Search .............. 385/1, 385/2, 4, 6, 8, 14, 129–132, 146, 147
See application file for complete search history.

(56) References Cited

U.S. PATENT DOCUMENTS 6,198,860 B1   3/2001   Johnson et al.

6,597,851 B2 *  7/2003   Johnson et al. ............. 385/131
2001/0038325 A1  11/2001   Smith et al.
2002/0041749 A1   4/2002   Johnson et al.

FOREIGN PATENT DOCUMENTS

| WO | WO 01/66833     |   | 9/2001  |
|----|-----------------|---|---------|
| WO | WO 01/66833 A1  | * | 9/2001  |
| WO | WO 01/77726     |   | 10/2001 |
| WO | WO 01/77726 A1  | * | 10/2001 |

OTHER PUBLICATIONS

"Three-Dimensionally Periodic Dielectric Layered Structure with Omnidirectional Photonic Band Gap," Johnson et al., *Applied Physics Letters*, Nov. 2000. vol. 77.

"Electrodynamics of Substances with Simultaneously Negative Electrical and Magnetic Permeabilities," Veselago. P.N. *Lebedev Physical Institute*. Academy of Sciences of the USSR.

(Continued)

*Primary Examiner*—Brian Healy
*Assistant Examiner*—Derek L. Dupuis
(74) *Attorney, Agent, or Firm*—Gauthier & Connors LLP

(57) ABSTRACT

A periodic structure is disclosed that includes an array of point defects within the periodic structure. The array includes point defects in a least two dimensions of the periodic structure. Each point defect permits electromagnetic fields of a first wavelength that is otherwise within a band gap range of the periodic structure to exist in each of the point defects.

22 Claims, 6 Drawing Sheets

OTHER PUBLICATIONS

"The Electrodynamics of Substances with Simultaneously Negative Values of e and µ," Veselago. P.N. *Lebedev Physical Institute.* Academy of Sciences of the USSR. Jul. 1964.

"Experimental Verification of a Negative Index of Refraction," Shelby et al. *Science.* Apr. 2001. vol. 292.

"Loop-Wire Medium for Investigating Plasmons at Microwave Frequencies," Smith et al. *Applied Physics Letters,* Sep. 1999, vol. 75, No. 10.

"Composite Medium with Simultaneously Negative Permeability and Permittivity," Smith et al. *Physical Review Letters,* May 2000. vol. 84.

"Magnetism from Conductors and Enhanced Nonlinear Phenomena," Pendry et al. *IEEE Transactions on Microwave Theory and Techniques.* Nov. 1999, vol. 47.

"Extremely Low Frequency Plasmons in Metallic Mesostructures," Pendry et al. *Physical Review Letters.* Jun. 1996, vol. 76.

"Negative Refraction Makes a Perfect Lens," Pendry et al. *Physical Review Letters.* Oct. 2000. vol. 85.

"Superprism Phenomena in Photonic Crystals," Kosaka et al. *Physical Review B.* Oct. 1998. vol. 58.

"Theory of Light in Propagation in Strongly Modulated Photonic Crystals: Refractionlike Behavior in the Vicinity of the Photonic Band Gap," Notomi. *Physical Review B.* Oct. 2000.

"Experimental Study and Modelling of High-transmission Defect Modes in Photonic Crystals with Graphite Structure," Gadot et al. *IEEE Proc.-Optoelectron.* Dec. 1998. vol. 145, No. 6.

\* cited by examiner

METAMATERIALS EMPLOYING PHOTONIC CRYSTAL

PRIORITY INFORMATION

The present application claims priority to U.S. Provisional Patent Application Ser. No. 60/372,051 filed Apr. 12, 2002.

BACKGROUND OF THE INVENTION

The invention relates to metamaterials that are constructed by incorporating point defects into a photonic crystal, a periodic dielectric structure that prohibits the propagation of light within a certain frequency range, or band gap. The point defects are localized structural or material changes that break the periodicity of the crystal, and which support localized electromagnetic field states that may resemble oscillating electric or magnetic dipoles.

Prior work on metamaterials has included structures formed of arrays of metallic elements. For certain wavelengths greater than the length scale of the elements, light that contacts the structure behaves as though the structure were a medium with effective electromagnetic properties. These properties may be quite different than those of naturally occurring materials or structures. For example, a microstructure that is formed from low density metallic non-magnetic conducting sheets is disclosed in *Magnetism from Conductors and Enhanced Nonlinear Phenomena*, by J. B. Pendry, A. J. Holden, D. J. Robbins and W. J. Stewart, IEEE TRANSACTIONS ON MICROWAVE THEORY AND TECHNIQUES, vol. 47, No. 11 (November 1999). This structure is disclosed to provide an effective magnetic permeability $\mu_{eff}$ that may be tuned to values not accessible in naturally occurring materials for incident radiation at microwave frequencies. A mechanism for lowering the plasma frequency in metallic mesostructures into the far infrared and even up to 8.2 GHz band, thus changing the frequency range in which the effective permittivity $\epsilon_{eff}$ is negative, is proposed in *Extremely Low Frequency Plasmas in Metallic Mesostructures*, by J. B. Pendry, A. J. Holden, and W. J. Stewart, PHYSICAL REVIEW LETTERS, vol. 76, No. 25 (June 1996).

These two structures may be useful for a variety of purposes; in combination, they may provide devices with negative indices of refraction. See for example, *Composite Medium with Simultaneously Negative Permeability and Permittivity*, by D. R. Smith, W. J. Padilla, D. C. Vier, S. C. Nemat-Nasser, and S. Schultz, PHYSICAL REVIEW LETTERS, vol. 84, No. 18 (May 2000); *The Electrodynamics of Substances with Simultaneously Negative Values of $\epsilon$ and $\mu$*, by V. G. Veselago, SOVIET PHYSICS USPEKHI, vol. 10, No. 4 (January–February 1968); *Experimental Verification of a Negative Index of Refraction*, R. A Shelby, D. R Smith, and S. Schultz, SCIENCE, vol. 292, pp. 77–79 (April 2001); and *Negative Refraction Makes a Perfect Lens*, by J. B. Pendry, PHYSICAL REVIEW LETTERS, vol. 85, No. 18 (October 2000).

It is desirable to develop a structure that provides some or all of the above metamaterial properties using excitation fields having frequencies in the visible light range and above. Because the material absorbtion losses are relatively high in metals for these frequencies, an alternative approach employing dielectric materials is attractive.

SUMMARY OF THE INVENTION

The invention provides a photonic crystal structure that includes an array of defects within it in accordance with an embodiment. The array may include, for example, point defects in at least two dimensions of the periodic structure, and each defect is constructed such that it would, in isolation from the other defects, permit electromagnetic fields of a frequency that is otherwise within a band gap range of the photonic crystal to be localized near the defect. Structures of the invention may be used to construct non-magnetic materials that may function as ferromagnetic or anti-ferromagnetic materials in certain conditions.

The invention further provides a single point defect in several periods of a photonic crystal structure, operated so that light emitted from this point defect is primarily composed of substantially magnetic multipole radiation in various embodiments. Similarly, the invention provides a single point defect operated such that the emitted light is primarily composed of substantially electric multipole radiation in other embodiments.

BRIEF DESCRIPTION OF THE DRAWING

The following description may be further understood with reference to the accompanying drawings in which.

Figure 1:
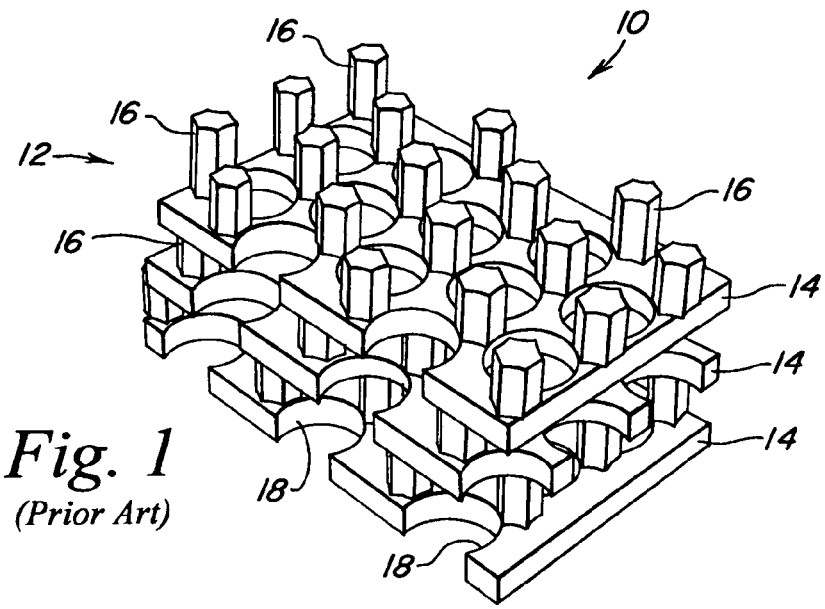
FIG. 1 shows a diagrammatic illustrative view of a prior art three-dimensional photonic crystal structure.

The drawings are shown for illustrative purposes and are not to scale.

DETAILED DESCRIPTION OF THE INVENTION

It has been discovered that photonic crystals may be employed to provide localized electromagnetic field states whose fields resemble those of electric or magnetic dipoles at desired locations in a photonic crystal at frequencies within a band gap of the photonic crystal. Photonic crystals, or photonic band-gap materials, are periodic dielectric structures that are designed so that light may not propagate through the structure within a certain frequency range, or band-gap. The propagation of light in a photonic crystal is governed by the four macroscopic Maxwell's equations, which in cgs units are as follows:

$$\nabla \cdot B = 0$$

$$\nabla \cdot D = 4\pi\rho$$

$$\nabla \times E + \frac{1}{c}\frac{\partial B}{\partial t} = 0$$

$$\nabla \times H - \frac{1}{c}\frac{\partial D}{\partial t} = \frac{4\pi}{c}J$$

where E and H are the electric and magnetic fields, D and B are the displacement and magnetic induction fields, and $\rho$ and J are the free charges and currents, which are generally taken to be zero. For certain three-dimensional dielectric structures, no propagating solutions of Maxwell's equations exist within a certain frequency range, or photonic bad gap. A feature of electromagnetism in periodic dielectric media is that there is no fundamental length scale, apart from the lattice constant. This leads to a relatively straightforward relationship between electromagnetic problems that differ only by a contraction or expansion of all distances. Consequently, a photonic crystal may be designed to have a band gap in a desired frequency simply by changing the lattice constant.

If a defect is made in the photonic crystal, by e.g., changing the dielectric constant near a single lattice site or adding or removing material, a localized mode (or defect mode) may be permitted to exist with a frequency inside the band gap. For frequencies within the band-gap therefore, light may be confined near deliberately introduced defects in the otherwise periodic structure. Defect modes can be excited by various means, including coupling a band gap frequency field from outside the structure into the structure, or generating a field having a frequency within the band gap within the structure. Since band gap frequency light decays within the structure at an exponential rate, some coupling may be possible near the surface of the substrate. Band gap frequency fields may be generated within the structure by using, for example, a dye in the area of the defect that becomes excited when exposed to a non-band gap frequency field and then emits a field having a wavelength that is within the band gap range of the crystal. As discussed in further detail below, these defects may be used in accordance with an embodiment of the invention as the building blocks for a new kind of metamaterial: one built up of combinations of point defects in a photonic crystal. While a variety of photonic-crystal structures could potentially be used, including hybrid/slab structures, the exemplary embodiment of three-dimensional photonic crystals is discussed in detail below.

Figure 2A:
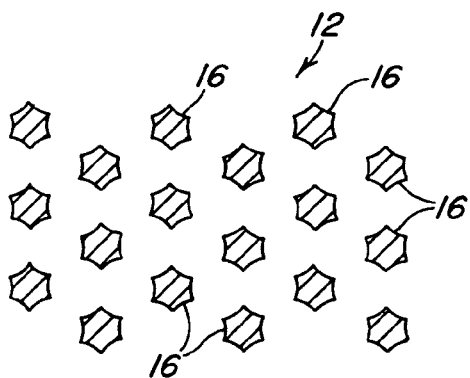
FIG. 2A shows a diagrammatic illustrative top view of a single rod layer of the prior art three-dimensional photonic crystal of FIG. 1.
Figure 2B:
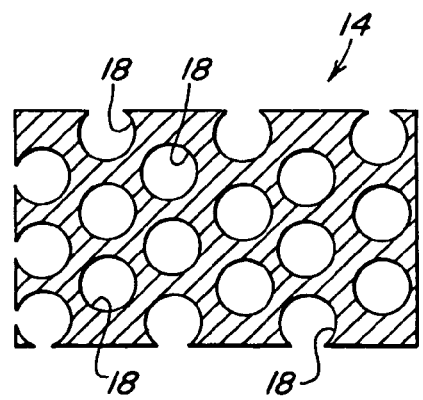
FIG. 2B shows a diagrammatic illustrative top view of a single hole layer of the prior art three-dimensional photonic crystal of FIG. 1.

As shown in FIG. 1, a crystal structure 10 may include two types of layers: rod layers 12 and hole layers 14. A top view of a rod layer 12 is shown in FIG. 2A, and a top view of a hole layer 14 is shown in FIG. 2B. Each rod layer 12 includes dielectric material that forms an array of uniform rods 16 as shown in FIG. 2A. Each hole layer 14 includes dielectric material that forms an array of uniform circular holes 18 as shown in FIG. 2B. Each successive rod layer 12 is staggered with respect to the previous rod layer so that the rods do not line up directly above one another. Similarly each successive hole layer 14 is staggered with respect to the previous hole layer so that the holes do not line up directly above one another.

The building blocks of a magnetic material are microscopic magnetic dipoles, and to create a synthetic analog point-defect modes in a photonic crystal may be employed. The rod and hole layers that make up the three-dimensional photonic crystal structure 10 mimic two-dimensional TE and TM polarized photonic crystals. By creating defects in these layers, the local field pattern and symmetry of the state may be made to resemble either an oscillating magnetic or electric moment, corresponding to the TM and TE polarizations respectively.

Figure 3:
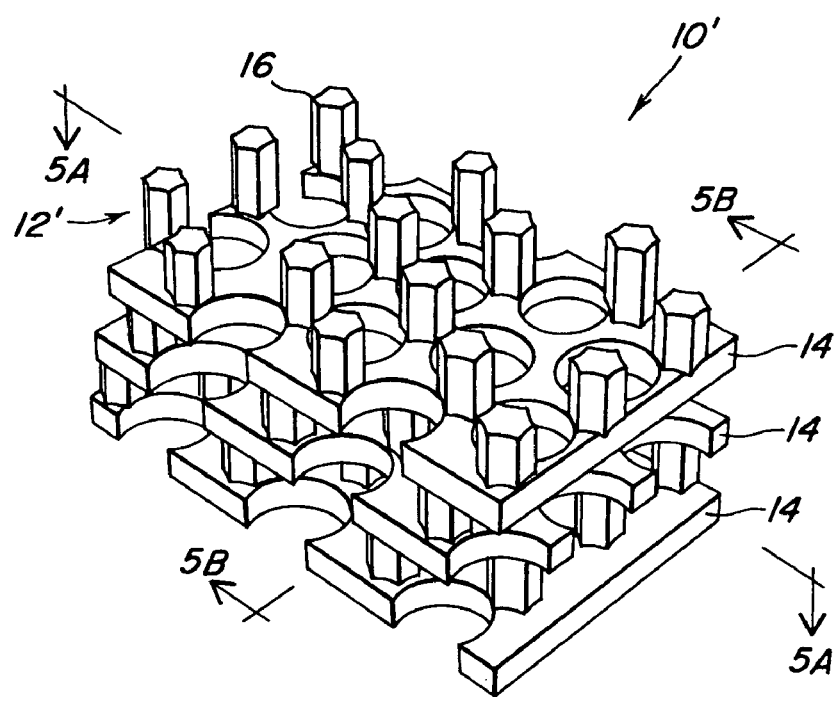
FIG. 3 shows a diagrammatic illustrative view of the three-dimensional photonic crystal structure of FIG. 1 after having been modified by removing a plurality of selected rods from a rod layer to provide an array of point defects in a photonic crystal metamaterial in which each corresponding point defect mode behaves rather like a dipole in accordance with an embodiment of the invention.
Figure 4:
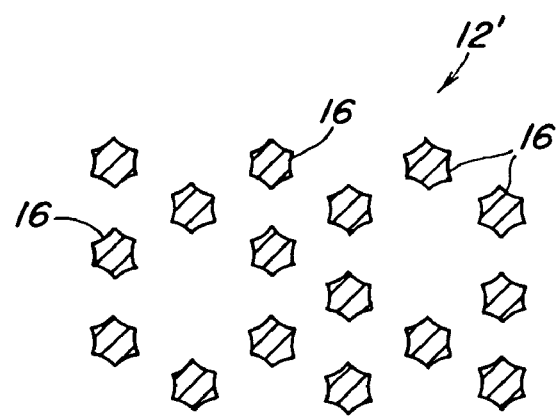
FIG. 4 shows a diagrammatic illustrative top view of a portion of the modified rod layer shown in FIG. 3.

In particular, point defects may naturally be created by altering a single layer of the structure; band gap frequency light is then strongly confined to the region of the point defect due to the large, complete band gap (around 20% of the mid gap frequency for Si/air structures). For example, as shown in FIGS. 3 and 4, point defects may be created in a crystal by removing selected rods from one of the rod layers 12' of the structure. Specifically, two rods are shown removed from the rod layer 12'. An array of such point defects may thereby be created on any number of rod layers by removing any number of rods from the periodic structure. In various embodiments, therefore, the wavelength of light that is permitted to exist at the point defect that is otherwise within the band gap may be less than about 100 μm, or even less than about 10 μm, or less than about 1 μm.

Figure 5A:
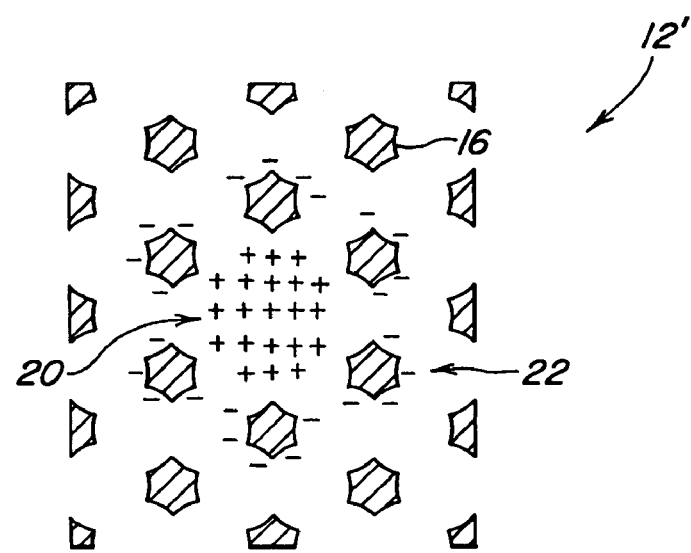
FIG. 5A shows a diagrammatic illustrative view of a defect mode electric field profile for a point defect in the crystal shown in FIG. 3 that is created by removing a rod from a rod layer in which the electric field in the z direction is plotted for a portion of a cross section taken along line 5A—5A of FIG. 3.
Figure 5B:
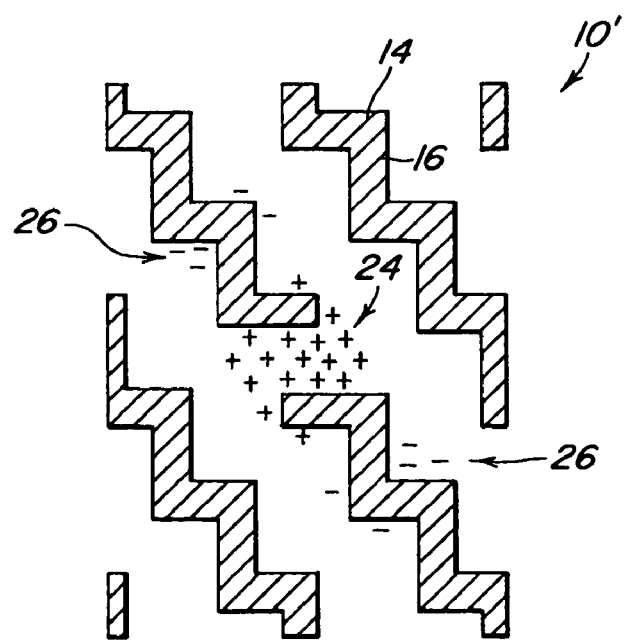
FIG. 5B shows a diagrammatic illustrative view of a defect mode electric field profile for a point defect in the crystal shown in FIG. 3 that is created by removing a rod from a rod layer in which the electric field in the z direction is plotted for a portion of a cross section taken along line 5B—5B of FIG. 3.

As shown in the defect mode profiles of FIGS. 5A and 5B, creating a point defect in a rod layer results in a point-defect state with an electric dipole-like field pattern as shown in FIGS. 5A and 5B. The electric field for this point-defect mode strongly resembles that of a electric dipole, oriented perpendicular to the plane of the rod layer as shown in FIG. 5A. In particular, the field shown at 20 is oriented in the positive direction perpendicular to the plane of the rod layer 12' (and coming out of the page as shown in FIG. 5A), and the field shown at 22 is oriented in the negative direction perpendicular to the plane of the rod layer 12' (and going into the page as shown in FIG. 5A). The field shown at 24 in FIG. 5B is the positive field and the field shown at 26 is the negative field. A polar electric point defect may therefore be created by removing a rod. The electric field in the midplane may be at least 75%, 85% or 95% polarized perpendicular to the plane.

Figure 6:
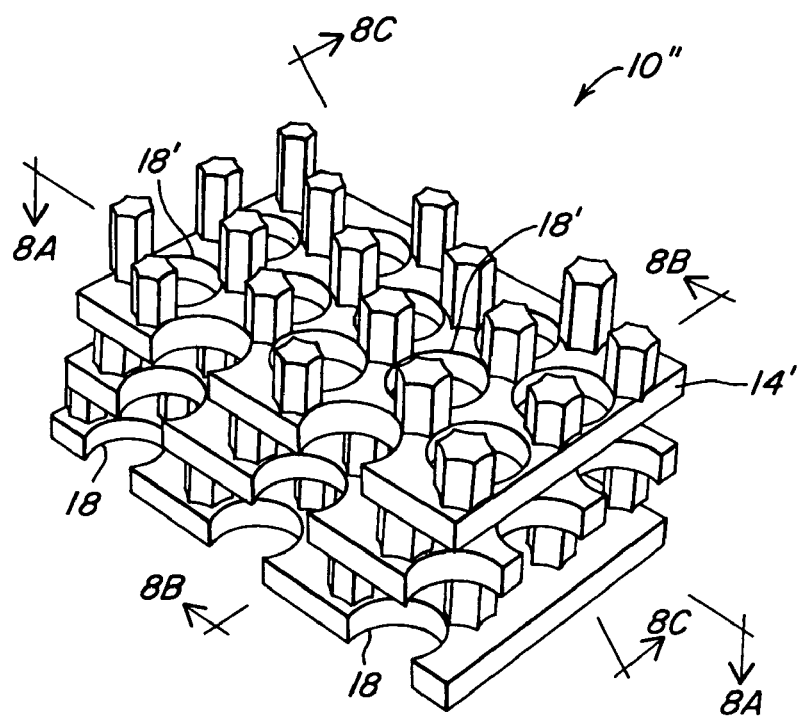
FIG. 6 shows a diagrammatic illustrative view of a diagrammatic illustrative view of the three-dimensional photonic crystal structure of FIG. 1 after having been modified by changing the radius of a plurality of holes in a hole layer to provide an array of point defects in a photonic crystal metamaterial in accordance with a further embodiment of the invention.
Figure 7:
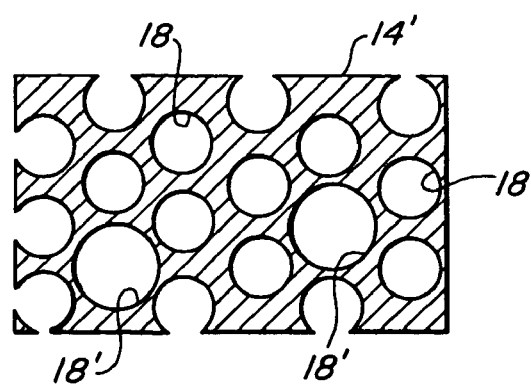
FIG. 7 shows a diagrammatic illustrative top view of a portion of the modified hole layer shown in FIG. 6.
Figure 8A:
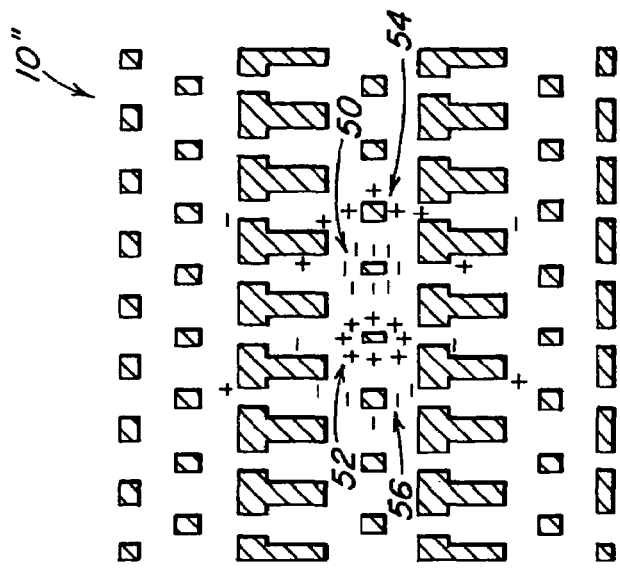
FIG. 8A shows a diagrammatic illustrative view of a defect mode magnetic field profile for a point defect in the crystal shown in FIG. 6 that is created by removing changing the radius of a hole in a hole layer in which the magnetic field in the z direction is plotted for a portion of a cross section taken along line 8A—8A of FIG. 6.
Figure 8B:
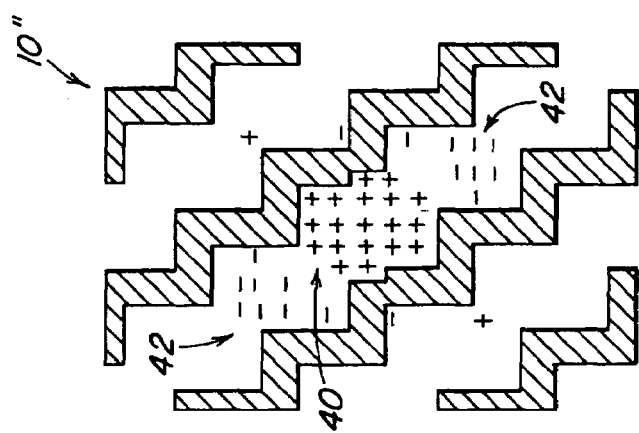
FIG. 8B shows a diagrammatic illustrative view of a defect mode magnetic field profile for a point defect in the crystal shown in FIG. 6 that is created by removing changing the radius of a hole in a hole layer in which the magnetic field in the z direction is plotted for a portion of a cross section taken along line 8B—8B of FIG. 6.
Figure 8C:
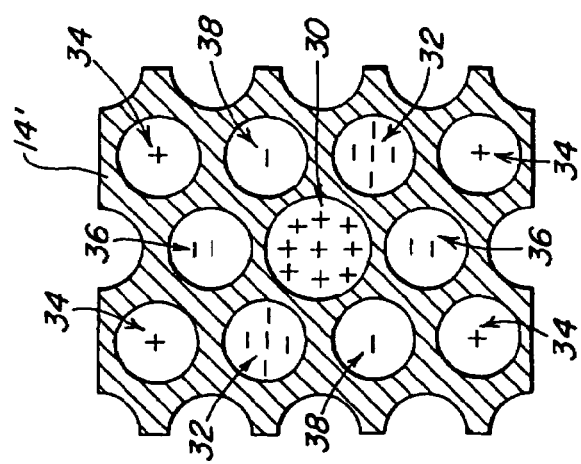
FIG. 8C shows a diagrammatic illustrative view of a defect mode electric field profile for a point defect in the crystal shown in FIG. 6 that is created by removing changing the radius of a hole in a hole layer in which the magnetic field in the z direction is plotted for a portion of a cross section taken along line 8C—8C of FIG. 6.

To create a defect with a magnetic character, the polarization is selected such that the magnetic field is perpendicular to the midplane layer (TE polarization) and the radius of a single hole 18' in a hole layer 14' is increased as shown in FIG. 6. The periodic structure 10" may include an array of holes 18' for which the radius has been increased from its bulk value of $0.414\bar{a}$ to $0.5\bar{a}$, where $\bar{a}$ is the nearest-neighbor spacing in either a hole or rod layer. Cross sections of the electromagnetic field mode for this defect in the bulk crystal are shown in FIG. 8A-8C. The defect mode resembles the field of an oscillating magnetic moment in several respects. The magnetic field in the midplane is almost completely (99%) polarized perpendicular to the plane, and the parity of the state is odd under inversion (the electric field is odd, while the pseudovector magnetic field is even). In various embodiments, the magnetic field in the midplane may be at least 75%, 85% or 95% polarized perpendicular to the plane Moreover, the local field pattern of the mode resembles that of an ideal dipole with some additional structure induced by the photonic crystal.

The magnetic field for this point-defect mode, therefore, strongly resembles that of a magnetic dipole, oriented perpendicular to the plane of the hole layer. In particular, as shown in FIG. 8A, the magnetic field shown at 30 is oriented in the positive direction perpendicular to the plane of the hole layer 14' (and coming out of the page), and the magnetic field shown at 32 is oriented in the negative direction perpendicular to the plane of the hole layer 12' (and going into the page). Perpendicular positive fields to a lesser extent also appears at 34 and perpendicular negative field appears to lesser extent at 36, and even lesser extent at 38. With reference to FIG. 8B, the magnetic field shown at 40 is perpendicular positive field and the magnetic field shown at 42 is perpendicular negative field, and with reference to FIG. 8C, the electric field shown at 52 and 54 is perpendicular positive field, and the electric field shown at 50 and 56 is perpendicular negative field.

The geometry of the crystal facilitates the combination of defects in various layers of the crystal and in various combinations. To make a metamaterial, regular or irregular arrays of point defects may be created within a photonic crystal. For a regular, periodic array, the electromagnetic modes of such a system may be characterized by a wavevector $\vec{k}$, where the relative phase at two defects separated by lattice vector $\vec{R}$ is $\exp(i\vec{k}\cdot\vec{R})$. For the $\vec{k}=0$ mode, the electromagnetic field at each of the defects fluctuates in phase, creating a domain of aligned magnetic moments. The combination of point defects thus provides a means of creating a coherent ferromagnetic state that fluctuates within the band gap. An anti-ferromagnetic-like state may be achieved by instead operating at a frequency near the edge of the band gap corresponding to a wavevector at the edge of the Brillouin zone. Such ferromagnetic-like and anti-ferromagnetic-like states may be created in an analogous fashion by working, e.g., with a rod layer of this photonic crystal, in which the character of the point defects resemble electric dipoles.

This type of dielectric metamaterial provides a means of creating states with magnetic character within a nonmagnetic photonic crystal material in accordance with an embodiment of the invention. Unlike a natural ferromagnetic, these materials have no built-in magnetic dipole moments. Instead, they store and concentrate input power, e.g., from an optical source. Consequently, the metamaterial may be designed so that the magnetic behavior occurs in a particular frequency range that is tunable from microwave to visible light frequencies, and in certain embodiments at least 10,000 GHz. Materials of the present invention may also be suitable for use at optical frequencies, for which naturally occurring materials have insignificant or very lossy magnetic responses. Potential applications may include the generation of a force between two ferromagnetic sheets and the generation of large, high frequency magnetic fields.

Defects may also be incorporated into a crystal structure so that the structure becomes a magnetic emitter. In other words, nearly all of the radiated power (e.g., at least 75% or 85% or 95% or even 98%) may be designed to be magnetic, rather than electric, multipole terms as determined by a multipole decomposition of the far field. This magnetic emitter, unlike an oscillating current loop (a familiar magnetic dipole source), may be designed to operate even at optical frequencies, where naturally occurring materials have an insignificant or very lossy magnetic response in certain embodiments. Moreover, because structures of the invention also support defect states that resemble electric moments, such structures may also be used to design electric emitters.

Figure 9:
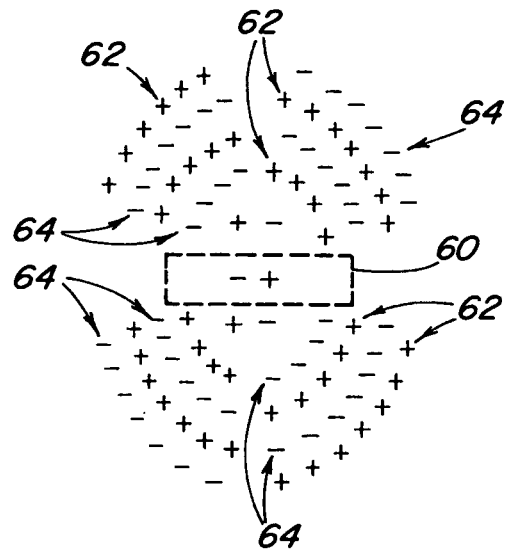
FIG. 9 shows a diagrammatic illustrative side view of an electric field profile for a finite crystal in accordance with an embodiment of the invention.
Figure 10:
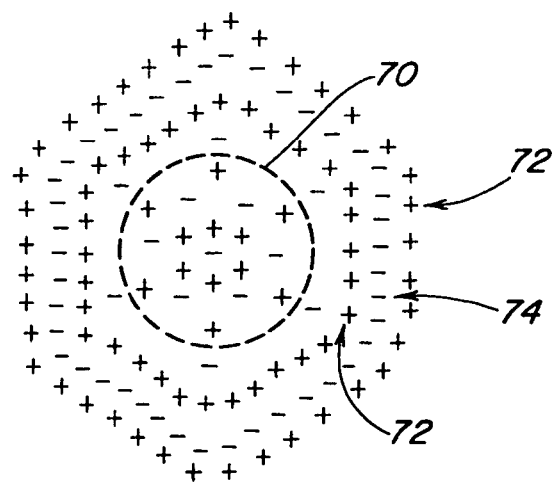
FIG. 10 shows a diagrammatic illustrative top view of a magnetic field profile for a finite crystal in accordance with another embodiment of the invention.

Consider for example, single magnetic polar defect within a hole layer of the three-dimensional crystal, where the crystal has been cut in the shape of a disk. As shown in FIG. 9, the electric field profile from a side view of a crystal 60 (shown in dashed lines) is similar to that of a magnetic dipole, with alternating semicircular positive direction field bands 62 and negative direction field bands 64. The magnetic field profile from a top view of a similar crystal 70 (such a slightly smaller sized crystal) is also similar to that of a magnetic dipole, with alternating circular positive direction field bands 72 and negative direction field bands 74.

To determine the degree of magnetic character of the mode, the properties of fields from such a defect in a finite crystal were analyzed. The coupling of light into field modes will depend on the mode profile at the crystal boundary. In order to preserve the dominant TE-like polarization of the mode, the crystal was cleaved close to the defect layer resulting in a crystal that was three hole layers and two rod layers high, with the defect contained in the central hole layer. The fields were determined using 3D, full-vectorial, finite-difference time-domain (FFTD) simulations of Maxwell's equations with perfectly-matched-layer boundary regions at the edges of the computational cell. The defect mode was excited using a magnetic-dipole-like source at the center of the defect. The frequency, amplitude, and quality factor (Q) of the mode were extracted from the field decay after source turn-off, using a low-storage filter-diagonalization method. The fields for three different crystals having radii of: $r=3.5\vec{a}$, $r=4.5\vec{a}$, and $r=5.5\vec{a}$ were analyzed. It was discovered that while the mode in the vicinity of the defect appeared similar for the different size crystals, the structure of the radiated fields differed significantly, with the field amplitudes of the radiated fields decreasing in the plane of the crystal when the radius of the crystal is increased.

The magnetic character of the field mode was quantitatively determined by performing a multipole decomposition of the far field. For a generalized localized source distribution, the magnetic field in the field zone ($r \gg \lambda$) may be written as:

$$H(r \gg \lambda) \cong \frac{e^{ikr-i\omega t}}{kr} \sum_{l,m} (-i)^{l+1} \times [a_E(l,m)X_{l,m} + a_M(l,m)\hat{r} \times X_{lm}]$$

where the $X_{lm}$ terms are the vector spherical harmonics, given by:

$$X_{lm}(\theta, \phi) = 1\sqrt{[l(l+1)]} \, LY_{lm}(\theta, \phi)$$

and L is the angular momentum operator, $1/i(r \times \nabla)$. The terms $a_M$ and $a_E$ are the magnetic and electric multipole moments, respectively, and each multipole radiates a time-averaged power of:

$$\frac{\sqrt{\mu_0/\varepsilon_0}}{2k^2} |a(l,m)|^2$$

Using the orthogonality relations for the vector spherical harmonics, $$\int X^*_{l'm'} \cdot X_{lm} d\Omega = \delta_{ll'}\delta_{mm'} \text{ and}$$

$$\int X^*_{l'm'} \cdot (\hat{r} \times X_{lm}) d\Omega = 0$$

the multipole coefficients $a_M$ and $a_E$ may be obtained by numerical integration over a sphere near the boundary of the computational cell.

The results are shown in the following Table 1.

TABLE 1

| | r = 3.5$\bar{a}$ | r = 4.5$\bar{a}$ | r = 5.5$\bar{a}$ |
|---|---|---|---|
| Q | 174 | 299 | 320 |
| $|a_M (1,0)|^2$ | 5% | 30% | 37% |
| $|a_M (3,0)|^2$ | 50% | 50% | 50% |
| $|a_M (5,0)|^2$ | 8% | 10% | 8% |
| Any of other $|a_M (l,m)|^2$ | ≤3% | <1% | <0.5% |
| Any $|a_E (l,m)|^2$ | ≤4% | <0.5% | <0.5% |
| $M_{pwr}$ | 79% | 96% | 98% |

The absolute value of the multipole moments squared, $|a(l,m)|^2$, is expressed as a percentage of the total power radiated. For all three crystal structures, the largest multipole moments were magnetic with m=0 and l=1, 3, or 5. As the crystal diameter increases, the strength of the (1,0) magnetic dipole term increases, while the strength of the (3,0) and (5,0) terms remain approximately fixed. This trend may be understood from the fact that the crystal must block fields in the lateral direction. As the l=0 component increases, it cancels the l=3 component to reduce the amplitude of the fields in the plane of the crystal. The percentage of the power that is emitted in magnetic multiple terms, $M_{pwr}$, is also shown in Table 1. The power is mostly magnetic for all three crystal radii studied. Moreover, the crystal height was found to be an important parameter in determining the percentage of power that goes into magnetic fields; increasing the height of the r=4.5$\bar{a}$ crystal so that it included nine hole layers significantly reduced $M_{pwr}$ from 96% to 60%.

An important feature of the magnetic nature of the fields is the primarily TE character of the mode in the midplane. In two dimensions, this would lead to purely magnetic fields, and the only electric multipole components in 3D are due to the deviations from the TE character. Away from the midplane, the deviations take the form of $\hat{z}$ components of E, and these components may induce electric fields, but that the fields are primarily in the lateral directions. By increasing the lateral crystal size therefore, these fields may be substantially eliminated and the magnetic character may be increased as observed in Table 1. Conversely, as the vertical size is increased, deviations from TE character become more pronounced and consequently, the percentage of magnetic fields is decreased.

Starting with a point defect in a bulk photonic crystal whose local field pattern resembles an oscillating magnetic moment, the crystal boundary may be cut so that the fields from the defect mode is almost completely magnetic. Unlike traditional magnetic sources, this magnetic emitter may be designed to operate even at optical frequencies. In other embodiments, the defect mode may be excited by shining light onto a crystal from an optical source, and this process may be enhanced by incorporating a fluorescent dye within the crystal to absorb outside the band gap and emit at a frequency of the point defect mode.

Using the point defect mode discussed above as a building block, arrays of defects may be designed in photonic crystals to yield structures that provide magnetic bulk properties. For example ferromagnetic or anti-ferromagnetic arrays may be created by operating at frequencies corresponding to wave vectors at the edge of the Brillouin zone, where adjacent defect states will have phase shifts of ~0 or ~π. Creating defects within the rod layer of the 3D photonic crystal, which behave like electric multipoles, could similarly allow the design of ferroelectric and anti-ferroelectric arrays.

Those skilled in the art will appreciate that numerous modifications and variations may be made to the above disclosed embodiments without departing from the spirit and scope of the invention.

What is claimed is:

1. A periodic structure comprising a plurality of point defects separated from one another within said periodic structure, each said point defect permitting electromagnetic fields of a first wavelength that is otherwise within a complete band gap range of said periodic structure to exist in each said point defect, and each point defect having a substantially magnetic multipole character.

2. The periodic structure as claimed in claim 1, wherein said point defects form part of an irregular array.

3. The periodic structure as claimed in claim 1, wherein said point defects form part of a regular array.

4. The periodic structure as claimed in claim 1, wherein said first wavelength is less than about 1 μm.

5. The periodic structure as claimed in claim 1, wherein said first wavelength is less than about 10 μm.

6. The periodic structure as claimed in claim 1, wherein said first wavelength is less than about 100 μm.

7. The periodic structure as claimed in claim 1, wherein each said point defect is separated from its closest neighboring point defect by at least two periods of the periodic structure.

8. The periodic structure as claimed in claim 1, wherein said plurality of point defects includes two point defects.

9. The periodic structure as claimed in claim 1, wherein said periodic structure includes no plane of symmetry.

10. The periodic structure as claimed in claim 1, wherein said periodic structure is periodic in three dimensions.

11. The periodic structure as claimed in claim 10, wherein said plurality of point defects are provided in each of the three dimensions of periodicity of the periodic structure.

12. The periodic structure as claimed in claim 10, wherein said plurality of point defects are separated from one another by at lest two periods of the periodic structure in three dimensions.

13. A method of providing a substantially localized electromagnetic field in a vicinity of each point defect in an array of point defects, said method comprising the steps of:
   providing a periodic structure comprising a first plurality of sets of first point defects in a first plurality of two dimensional arrays of said periodic structure, and a second plurality of sets of second point defects in a second plurality of two dimensional arrays;
   exciting each point defect; and
   producing an electromagnetic field mode that is substantially localized at a plurality of locations, each location corresponding to a point defect, and each of said first plurality of sets of first point defects having a substantially magnetic multipole character.

14. The method as claimed in claim 13, wherein a far-field electromagnetic radiation that is emitted from the electromagnetic field mode at a location has a substantially magnetic multipole character.

15. The method as claimed in claim 13, wherein the array of point defects provide an oscillating ferromagnetic-like array of substantially localized fields in the same direction and in phase under excitation conditions.

16. The method as claimed in claim 13, wherein the point defects provide an alternating oscillating anti-ferromagnetic-like array of substantially localized fields in the same direction and alternately out of phase with respect to one another under excitation conditions.

17. A method of providing a substantially localized electromagnetic field in a vicinity of a point defect, said method comprising the steps of:
   providing a three-dimensionally periodic structure comprising a first three-dimensional point defect;
   exciting said first three-dimensional point defect; and
   producing a first far-field electromagnetic radiation emitted from an electromagnetic field mode that is substantially localized in a vicinity of said first three-dimensional point defect and said first far-field electromagnetic radiation has a substantially magnetic multipole character.

18. A method as claimed in claim 17, wherein said method further includes the steps of:
   providing a second three-dimensional point defect in said periodic structure;
   exciting said second three-dimensional point defect; and
   producing a second far-field electromagnetic radiation emitted from an electromagnetic field mode that is substantially localized in a vicinity of said second three-dimensional point defect and said second far-field electromagnetic radiation has a substantially magnetic multipole character.

19. The method as claimed in claim 18, wherein said first and second three-dimensional point defects provide an oscillating ferromagnetic-like array of substantially localized fields in the same direction and in phase under excitation conditions.

20. The method as claimed in claim 18, wherein said first and second three-dimensional point defects provide an alternating oscillating anti-ferromagnetic-like array of substantially localized fields in the same direction and alternately out of phase with respect to one another under excitation conditions.

21. The method as claimed in claim 18, wherein said second three-dimensional point defect is separated from said first three-dimensional point defect by three dimensions.

22. The method as claimed in claim 17, wherein said method further includes the steps of:
   providing a second three-dimensional point defect in said first periodic structure;
   exciting said second point defect; and
   producing a second far-field electromagnetic radiation emitted from an electromagnetic field mode that is substantially localized in a vicinity of said second three-dimensional point defect and said second far-field electromagnetic radiation has a substantially magnetic multipole character, said second three-dimensional point defect being separated from said first three-dimensional point defect by three dimensions and said first and second three-dimensional point defects provide substantially polarized magnetic fields that are polarized along substantially parallel axes.

* * * * *